UNITED STATES PATENT OFFICE 1,988,615

DRYING OIL COMPOSITION

Victor H. Turkington, Caldwell, and William H. Butler, Arlington, N. J., assignors to Bakelite Corporation, New York, N. Y., a corporation of Delaware No Drawing. Application May 9, 1930, Serial No. 451,191

8 Claims. (Cl. 134—26)

This invention relates to drying oil compositions, such as varnishes, paints, enamels, etc., and suitable for coatings, adhesives, and/or binders.

A drying oil composition comprises in general a fatty oil vehicle, as linseed oil, tung oil, etc., with or without the addition of an oil-soluble resin and a filler or bodying material usually consisting of a pigment in the case of paint manufacture. A composition of this character forms a continuous film when applied as a coating, for example, by oxidation of the vehicle, and in order to accelerate the drying action it is customary to add oxidizing agents or driers; the oxidation action, however, continues after the film is formed, and in time the film burns itself up and so loses its homogeneous and continuous nature. The inclusion of oil-soluble resins gives depth and extension to the film and generally modifies the film characteristics in other respects, for example, resistance to moisture penetration, to the action of sunlight, etc.

Condensation products of a phenol and a methylene-containing agent (formaldehyde) characterized by a fusible soluble initial condition that is convertible to a final infusible and practically insoluble condition by the application of heat, in their hardened or polymerized condition have properties of water-proofness, hardness, resistance to weathering, acids, weak alkalies and other destructive influences, etc. that point to their desirability in oil compositions; but the commonly known forms are not soluble in drying oils unless combined with at least equal and usually larger proportions of rosin, ester gums or similar natural resins or derivatives. With the addition of equal amounts of natural resins, however, fluxing at high temperatures is required and it also becomes necessary to cook the resinous-oil mixture at these high temperatures to secure a product sufficiently soluble to permit of the addition of a thinner without separation. Furthermore the inclusion of large amounts of resinous material in drying oil compositions, particularly those intended for use as paint vehicles, is not desirable on account of an increasing viscosity and tackiness as well as a decreasing flexibility or elasticity with increasing proportions of resin; and the retention of the desirable features of oil paints, namely, ease of brushing out, flexibility, high coverage, requires a high percentage of oil. These considerations limit the addition of resinous materials to not more than 20%, for with greater proportions varnishes are produced which while suitable as coating compositions and binders have not the properties found requisite in paint vehicles. Therefore it is evident that dilution with equal or greater proportions of a natural resin greatly reduces the amount of a phenolic resinoid that can be incorporated in order to comply with these conditions.

It is further known that an addition of a blending agent such as rosin or equivalent natural resin retards the polymerization of the oil as well as having other deleterious effects on the oil composition and deposited film. We have discovered, however, that contrary to these objections inherent in rosin and the like, phenolic resins have a marked accelerating power on polymerization of the oil which means that a much lower cooking temperature can be used and/or much less time is required to finish the process as compared with a resin addition. Phenolic resins also have a remarkably strong accelerating effect on the drying of the film in a manner explainable only on the hypothesis that polymerization of the oil likewise takes place during drying rather than or in addition to oxidation for there is not the increase in weight that occurs when a comparative result is produced by oxidation alone. The usual toughness and durability of films so obtained bspeak the correctness of this hypothesis, and these results are surprisingly noticeable with even small proportions, 10 or 5 per cent or less, of phenolic resin. Acceleration of the drying action furthermore means that a much smaller proportion of metallic drier than is customary need be added for a desired speed of drying and this in turn further contributes to an increase in life and toughness of a film. We have also found that the inclusion of rosin or equivalent resin with a phenolic resin neutralizes these highly desirable effects of a phenolic resin to a degree depending upon the proportion of the diluting resin; in other words, the dilution of a phenolic resin with rosin or the like to secure oil solubility of the commonly known forms is effective to prevent utilization of the useful properties of a phenolic resin addition. It therefore follows from these discoveries that the best types of drying oil compositions are obtained by the use of phenolic resin undiluted with rosin or equivalent resins.

Among additional characteristics of evident commercial value imparted to an oil composition by a phenolic resin is that of improved resistance to weak alkalies, soaps, etc. Resistance to moisture is likewise increased to a marked degree, and films having phenol resinoid additions not only do not whiten but the films exert a marked resistance to water penetration. The acid resistance of phenolic resins is likewise present in drying oil compositions containing them to a degree dependent on the relative proportions of resin and oil.

Phenol resins that are oil-soluble without the addition of rosin or equivalent resin or derivative are obtainable in a number of ways. For instance we have found that an oil-soluble resin can be obtained by following the procedure outlined in the Byck Patent 1,590,079 granted July 22, 1926. Likewise a resin made by reacting say equal parts by weight of a substituted phenol with a molecular weight higher than 121 such as multiple ring phenol such as parahydroxydiphenyl and formaldehyde can be heated with tung oil and thereafter dissolved in linseed oil; such a resin and composition forms the subject matter of our copending application Ser. No. 336,007 filed Jan. 29, 1929. Or oil-soluble resins are formed by reacting a phenol such as cresol with tung oil and hexamethylenetetramine; a copending appending application Ser. No. 343,574 is directed to this type of resin. Phenol resins soluble in oil are likewise possible by other methods than those to which reference has been made. Such oil-soluble phenol resins have in general the properties hereindescribed and are accordingly suitable for the purposes of this invention. For completeness of disclosure, however, some examples are herewith given disclosing specifically the manufacture and use in oil compositions of typical oil-soluble resins. It is to be understood that the proportions of resin to fatty oil stated are not restrictive but may be varied to any degree found practical.

Example 1

100 parts of a phenol containing two or more benzene rings, such as parahydroxydiphenyl, and 100 parts commercial formaldehyde are reacted together by heating to form a resin. This resin is then heated together with about 100 parts China wood oil at a temperature of approximately 210° C. until a sample on cooling remains clear and will stand dilution with an equal weight of cold linseed oil without clouding. Linseed oil is added slowly holding temperature above 200° C. and then gradually increasing the temperature and holding it until the desired viscosity is obtained. Further amounts of linseed oil can thereupon be included and small amounts of drier are added; for instance with the total addition of about 800 parts of linseed oil, 14 parts litharge and 2 parts cobalt acetate are ample, the mixture being stirred well until the driers are thoroughly dissolved. Upon cooling to room temperature the composition is ready to be mixed with pigments and volatile thinners to produce paints that are characterized by rapid drying, exceptional resistance to weathering and to moisture and weak alkalies.

If heating of the above composition be continued, either before or after the addition of driers, the viscosity increases and the composition is transformed from a liquid into a tough, rubbery solid which is suitable as a binding medium in plastic compositions.

Example 2

Heat 100 parts commercial cresol, 200 parts China-wood oil and 25 parts hexamethylenetetramine together at 200° C. until foaming stops. Add 400 parts linseed oil and heat to 300° C. and hold at this temperature until the desired viscosity is obtained. Add 300 parts cold linseed oil and 20 parts litharge. When cooled to room temperature the composition is ready for use as a paint vehicle.

Example 3

Digest 100 parts phenol, 100 parts linseed oil and 1 part phosphoric acid together at boiling temperature under a reflux condenser for 8 hours. Cool to 100° C. and add 30 parts trioxymethylene and continue refluxing until the mix thickens to the desired consistency and the odor of formaldehyde has practically disappeared. Then add 500 parts linseed oil and heat to 260° C. until desired viscosity is obtained. Cool to 220° C. and add metallic driers.

It will be obvious from the foregoing example that the initial amount of drying oil may be incorporated with the phenol-aldehyde reaction product either (1) by incorporating it with one of the ingredients before the reaction, (2) by incorporating it during the reaction, or (3) by incorporating it with the previously reacted product; and the invention includes within its scope these methods of incorporating the drying oil.

The best results are usually obtained when the phenol-methylene resin is first combined with China-wood oil and later mixed with linseed or other oils. Most phenol resins are more readily combined with China-wood oil than with other oils, though after they have been combined with China-wood oil the phenol resin-China-wood oil product first formed may then be incorporated with large amounts of linseed or other oils and the resulting final product has been found to possess the desirable characteristics of the original phenol resin-China-wood oil composition to an unexpected degree. For example, a composition containing only 5 parts phenol resin, 10 parts China-wood oil and 85 parts linseed oil, which might be expected to exhibit properties closely resembling those of the same mix of oils without the phenol resin, is found to be markedly different. The inclusion of the 5% of phenol resin causes the whole composition to harden at a faster rate and the final product to be much more resistant to moisture, weak alkalies and weathering.

Although the use of China-wood oil as described above is advantageous it is, however, not essential. The phenol resin may be combined with linseed oil alone or with other drying oils and similar results obtained and for some purposes where lower viscosity compositions are desirable, such compositions made without China-wood oil are preferable. On the other hand a vehicle that is suitable for paints is obtained from tung oil alone when properly cooked with a phenolic resin; this is a surprising and novel effect for raw tung oil is not usable on account of gas checking, frosting, etc., and cooking to the point hitherto made necessary to overcome these defects gives too much body for brushing purposes. A paint vehicle has thus been made from as low as 5 per cent of an oil-soluble phenol resin added to 95 percent of tung oil and cooked around 500° F. to a point where a sample showed gas-proofness; such a vehicle when mixed with about one and one-half times its weight of pigment gave a paint with good brushing properties and coverage and drying within about two hours to a film having high gloss and water-proofness. The film was likewise characterized by alkali resistance; but the addition of but 5 percent of rosin to the composition destroyed this property of alkali resistance.

Comparative tests of a varnish made with 100 parts of a phenol-resonoid and 200 parts of tung oil and a second varnish made with 100 parts of ester gum and 200 parts of tung oil, each one having the same addition of a metallic drier, together with blends of these varnishes of different proportions illustrate very clearly the relative values of a phenol resin and a natural resin. The results and properties are given in the following table. Elasticity was determined by the standard test of adding Kauri gum and finding the amount of such addition necessary to produce cracks on bending around a 3 mm. rod after baking 5 hours at 95° C.; these figures when compared with the hardness figures show that increased hardness with phenol resin is not accompanied by decrease in flexibility or toughness but rather the contrary. The durability rating figures indicate the relative freedom from checks, cracks or signs of failure of films applied to panel and exposed for 5 months on a roof at a 45° angle. Hardness figures were obtained with a swinging beam apparatus.

ing the mixture to a desired viscosity by heating.

3. Process of preparing a liquid composition suitable for coating which comprises reacting a phenol and an aldehyde in the presence of a drying oil in amount approximately that of the phenol to yield a homogeneous product with resinous characteristics when cooled, thereafter adding further amounts of drying oil in excess of the amount initially used, and heating the mixture at a temperature approximately 200° C. or above to the desired viscosity.

4. Process of preparing a liquid composition suitable for coating which comprises incorporating initially a relatively minor proportion of a drying oil with an oil-soluble phenol-aldehyde reaction product having an accelerating effect on the drying of the oil into a solution remaining clear upon cooling, adding thereto in relatively major proportion a drying oil, and bringing the mixture so obtained to a desired viscosity by heating.

5. Liquid composition suitable for coating com-

Table

| Sample no. | 1 | 2 | 3 | 4 | 5 | 6 | 7 |
| --- | --- | --- | --- | --- | --- | --- | --- |
| Percent oil-soluble phenol resin. | 100 | 75 | 50 | 25 | 10 | 5 | 0 |
| Percent ester gum | 0 | 25 | 50 | 75 | 90 | 95 | 100 |
| Drying time | 1 hr. | 1¼ hrs. | 1¾ hrs. | 2¾ hrs. | 3½ hrs. | 5 hrs. | 7½ hrs. |
| Hardness 8 hours | 60 | 54 | 57 | 33 | 19 | 17 | 16 |
| Hardness 24 hours | 157 | 139 | 125 | 114 | 111 | 130 | 129 |
| Hardness 72 hours | 101 | 164 | 149 | 139 | 139 | 152 | 159 |
| Elasticity (Kauri reduction) | 145 | 125 | 110 | 80 | 70 | 65 | 60 |
| Durability rating | 10 | 9 | 8 | 6 | 4 | 2 | 1 |
| Resistance to boiling | Unaffected after 2 hours. | Unaffected after 2 hours. | Slightly soft after 2 hours. | Soft 80 min. removed 120 min. | Soft 27 min. removed 55 min. | Soft 22 min. removed 44 min. | Soft 15 min. removed 30 min. |
| Resistance to 5 percent NaOH Sol. at 70° F. | Practically unaffected after 24 hours. | Practically unaffected after 24 hours. | do | Soft 24 hrs. not removed after 24 hrs. | Soft 10 hrs. not removed after 24 hrs. | Soft 4 hrs. not removed after 24 hrs. | Soft 1 hour removed 3 hours. |
| Resistance to boiling water 15 minutes. | No whitening film hard. | No whitening film hard. | No whitening film hard. | No whitening film hard. | Slightly white film hard. | Slightly white slightly soft. | White soft. |
| Resistance to boiling water 1 hour. | do | do | Very slightly white film hard. | Slightly white slightly soft. | Medium white slightly soft. | White soft | Do. |

We claim:

1. Process of preparing a liquid composition suitable for coating which comprises heating an oil-soluble phenol-aldehyde reaction product having an accelerating effect on the drying of the oil with a substantially equal weight of China wood oil until a sample remains clear on cooling, adding drying oil in amount such that the mixture includes a multiple proportion of oil in comparison with that of the product, and heating the mixture at a temperature approximating 200° C. or above to the desired viscosity.

2. Process of preparing a liquid composition suitable for coating which comprises heating an oil-soluble phenal-aldehyde reaction product having an accelerating effect in the drying of the oil with a drying oil in relatively minor proportion until a sample remains clear on cooling, adding the remainder of drying oil in a relatively major proportion such that the mixture includes a multiple proportion of oil in comparison with that of the condensation product, and bringprising a drying oil in relatively major proportion modified by the inclusion of a solution of an oil-soluble phenol-aldehyde reaction product having an accelerating effect on the drying of the oil and having incorporated therewith by means of heat a relatively minor proportion of a drying oil, said composition being a homogeneous clear solution and a film thereof when air-dried having a resistance to a 5 per cent sodium hydroxide at 70° F. such that it is not softened within a period of hours.

6. Composition according to claim 5 in which the reaction product comprises not more than 20 per cent of the composition and characterized by suitability as a brushing vehicle for pigment in the preparation of paint.

7. Composition according to claim 5 in which the drying oil includes tung oil.

8. Composition according to claim 5 in which the drying oil includes tung oil and linseed oil.

VICTOR H. TURKINGTON.
WILLIAM H. BUTLER.